United States Patent
Wojsznis et al.

(10) Patent No.: US 7,113,834 B2
(45) Date of Patent: Sep. 26, 2006

(54) STATE BASED ADAPTIVE FEEDBACK FEEDFORWARD PID CONTROLLER

(75) Inventors: Wilhelm K. Wojsznis, Austin, TX (US); Terrence L. Blevins, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 612 days.

(21) Appl. No.: 10/419,582

(22) Filed: Apr. 21, 2003

(65) Prior Publication Data
US 2003/0195641 A1 Oct. 16, 2003

Related U.S. Application Data

(63) Continuation-in-part of application No. 09/597,611, filed on Jun. 20, 2000, now Pat. No. 6,577,908.

(51) Int. Cl.
G05B 13/02 (2006.01)
(52) U.S. Cl. .............................. 700/33; 700/31; 700/37; 700/42; 700/45
(58) Field of Classification Search ............ 700/28–34, 700/37, 38, 40, 42, 44, 45, 47, 51, 52, 54, 700/173; 706/14, 23; 318/561, 610
See application file for complete search history.

(56) References Cited

U.S. PATENT DOCUMENTS

| | | | |
|---|---|---|---|
| 4,641,235 A | 2/1987 | Shigemasa et al. | |
| 5,018,215 A | 5/1991 | Nasr et al. | |
| 5,043,863 A | 8/1991 | Bristol et al. | |
| 5,159,547 A | 10/1992 | Chand | |
| 5,180,896 A | 1/1993 | Gibby et al. | |
| 5,272,621 A | 12/1993 | Aoki | |
| 5,335,164 A | 8/1994 | Gough, Jr. et al. | |
| 5,453,925 A | 9/1995 | Wojsznis et al. | |
| 5,461,559 A | 10/1995 | Heyob et al. | |
| 5,568,378 A | 10/1996 | Wojsznis | |
| 5,587,899 A | 12/1996 | Ho et al. | |
| 5,625,552 A | 4/1997 | Mathur et al. | |
| 5,748,467 A | 5/1998 | Qin et al. | |
| 6,041,320 A | 3/2000 | Qin et al. | |
| 6,049,738 A | 4/2000 | Kayama et al. | |
| 6,128,541 A * | 10/2000 | Junk | 700/39 |
| 6,249,712 B1 | 6/2001 | Boiquaye | |

(Continued)

FOREIGN PATENT DOCUMENTS

WO WO 97/12300 4/1997

(Continued)

OTHER PUBLICATIONS

Hespanha et al., "Overcoming the limitations of adaptive control by means of logic-based switching", Systems and Control Letters 49: 49-65 (2003).

(Continued)

*Primary Examiner*—Crystal J. Barnes
(74) *Attorney, Agent, or Firm*—Marshall, Gerstein & Borun LLP

(57) ABSTRACT

A state based adaptive PID controller includes a model set component including a plurality of process models, each process model including a plurality of parameters. An error generator generates a model error signal representative of a difference between a model output signal and a process output signal. A model evaluation component computes a model squared error based on the model error signal. A parameter interpolator calculates an adaptive parameter value based on the model squared error. A controller update component updates adaptive controller parameter values based on adaptive parameter values.

39 Claims, 3 Drawing Sheets

U.S. PATENT DOCUMENTS

| | | | |
|---|---|---|---|
| 6,330,484 B1 | 12/2001 | Qin | |
| 6,353,766 B1* | 3/2002 | Weinzierl | 700/28 |
| 6,445,962 B1 | 9/2002 | Blevins et al. | |
| 6,577,908 B1* | 6/2003 | Wojsznis et al. | 700/42 |
| 6,745,088 B1* | 6/2004 | Gagne | 700/29 |
| 2005/0149209 A1* | 7/2005 | Wojsznis et al. | 700/30 |

FOREIGN PATENT DOCUMENTS

| | | |
|---|---|---|
| WO | WO 00/33209 | 6/2000 |
| WO | WO-01/98845 A1 | 12/2001 |

OTHER PUBLICATIONS

Morse, "A Bound for the Disturbance—to-Tracking—Error Gain of a Supervised Set-Point Control System," in Perspectives in Control: Theory and Applications, pp. 23-41, Dorothee Normand-Cyrot (ed.), Spring Verlag, New York, (1998).

De Persis, et al., "Further results on switched control of linear systems with constraints," Proceedings of the 41st IEEE Conference on Decision and Control, Las Vegas, NV, USA, pp. : 2810-2815, Dec. 2002.

Hespanha et al., "Stabilization of Nonholonomic Integrators via Logic-Based Switching," Automatica, pp. 385-394 (Mar. 1999).

Morse, "Control Using Logic-based Switching," in Trends in Control: A European Perspective, Alberto Isidori (ed.), Springer Verlag, New York (1995).

Jadbabaie et al., "Coordination of Groups of Mobile Autonomous Agents Using Nearest Neighbor Rules," IEEE Transactions on Automatic Control, 48(6), pp. 988-1001 (Jun. 2003).

Liberzon et al., "Stability of switched systems: a Lie-algebraic condition," Systems and Control Letters, vol. 37, pp. 117-122 (Jun. 1999).

Liberazon et al., "Basic Problems in Stability and Design of Switched Systems," IEEE Control Systems Magazine, pp. 59-70 (Oct. 1999).

Morse et al., "Applications of Hysteresis Switching in Parameter Adaptive Control," IEEE Transactions on Automatic Control, 37(9) (Sep. 1992).

Pait et al., "A Cyclic Seitching Strategy afor Parameter-Adaptive Control," IEEE Transactions on Automatic Control, 39(6) (Jun. 1994).

Examination Report under Section 18(3) issued by the United Kingdom Patent Office on Feb. 14, 2006 for GB Application No. 0408598.1.

Astrom and Hagglund, "Industrial Adaptive Controllers Based on Frequency Response Techniques", Automatica, vol. 27, No. 4, pp. 599-609 (1991).

* Hanagud, S., Glass, B.J., and Calise, A.J., "Artificial Intelligence -Based Model-Adaptive Approach to Flexible Structure Control", American Institute of Aeronautics and Astronautics, Inc. vol. 13, No. 3 pp. 534-544 (1987).

Narendra K.S., and Balakrishnan, J., "Adaptive Control Using Multiple Models", IEEE Transactions on Automatic Control, vol. 42, No. 2, pp. 171-187 (Feb. 1997).

International Search Report in PCT/US01/19706 dated Oct. 23, 2001.

Search Report under Section 17(5) issued by the United Kingdom Patent Office on Aug. 18, 2004 for GB Application No. 0408598.1.

Wojsznis and Blevins, "Adaptive Feedback/Feedforward PID Controller", U.S. App. No. 09/597,611, filed Jun. 20, 2000, pp. 1-34.

* cited by examiner

STATE BASED ADAPTIVE FEEDBACK FEEDFORWARD PID CONTROLLER

CROSS REFERENCE TO RELATED APPLICATIONS

This application is a continuation-in-part of U.S. patent application Ser. No. 09/597,611 filed on Jun. 20, 2000 now U.S. Pat. No. 6,577,908 and entitled "Adaptive Feedback/Feedforward PID Controller", the entire specification is of which is hereby explicitly incorporated by reference.

TECHNICAL FIELD

The disclosed method and apparatus generally relates to process control techniques and, more particularly, to an adaptive PID (Proportional, Integral and Derivative) controller that is characterized by parameter values derived from an interpolation of process model parameters.

DESCRIPTION OF THE RELATED ART

It is known in the art to use logic-based controller switching strategies to implement adaptive process control in automated systems such as large manufacturing plants and chemical refineries, for example. An exemplary discussion of logic-based switching strategies can be found in, for example, Morse, F. M. Pait, and S. R. Weller's, "Logic-Based Switching Strategies for Self-Adjusting Control", IEEE 33$^{rd}$ Conference on Decision and Control (December 1994). It may be useful to categorize, logic-based controller-switching strategies into one of two approaches, generally identified as a prerouted controller approach and an indentifier-based parameterized controller approach.

Prerouted controller tuning, in principle, evaluates possible controllers contained in a predefined set of possible controllers. The evaluation is complete when a controller is identified that performs satisfactorily. Prerouted controller tuning systems are relatively simple to design and impose few requirements on controller structure. However, the advantages of prerouted controller tuning systems are overshadowed by intrinsically poor performance with respect to tuning time, i.e. an inordinate length of time is required to select the optimal controller from the predefined set.

Identifier-based, parameterized controllers generally consist of two or more parameter-dependent subsystems, an identifier which generates an output estimation error, and an internal controller. In operation, a control signal, based on an estimate of a suitably defined model set, is communicated to a process being controlled. Identifier-based, parameterized controllers embody a controller-switching strategy based on the concept of "cyclic switching." Cyclic switching can be employed with or without providing an additional excitation signal to the process.

A worthwhile discussion of the cyclic switching approach to process control adaptation may be found in K. S. Narendra and J. Balakrishnan's, "Adaptive Control Using Multiple Models," IEEE Transactions on Automatic Control, Vol. 42, No. 2, pp. 177–187 (February 1997). The article discloses a process control system including a controller characterized by a plurality of parameters and N identification models operating in parallel and having model parameters corresponding to the plurality of controller parameters. At any point in time, a single model and corresponding parameterized controller, is selected by a switching rule and the corresponding control input is used to control the process. The identification models may be fixed parameter models or may be adaptive parameter models, depending on the requirements of the process, the needs of the operator and any other appropriate considerations. Fixed parameter model control systems offer a simple and effective means of insuring the existence of at least one model characterized by parameters sufficiently close to those of the unknown process.

Cyclic switching based process control systems using fixed parameter models provide for rapid adaptation speeds, but require the design and storage of a significant number of models within the process controller. It should be noted that fixed models are capable of precisely representing only a finite number of process environments or conditions, and to asymptotically improve process accuracy an adaptive model must be employed.

Practically speaking, model based switching strategies pose a number of problems due to the significant number of models required for a reasonable process approximation. For example, a simple single-input, single-output (SISO) system, including a fixed model based self-tuner can reasonably be expected to include hundreds of fixed models in order to achieve satisfactory process performance. Thus, as systems become more complex, e.g. multivariable systems, the required number of customized, fixed models increases exponentially, thereby increasing the system setup time and system storage requirements. More effective solutions require consideration of the specific process model structure and controller type, and suggest the replacement of a simple switching strategy with more elaborate procedures.

A modified model-based approach for a Dahlin controller has been offered by Gendron in the text, "Improving the Robustness of Dead-Time Compensators for Plants with Unknown of Varying Delay," Control Systems 90 Conference (Helsinki 1990). The text discloses a simple first-order-plus-dead-time process model for providing process adaptation based on dead time variation. Rather than relying on simple model switching, the controller utilizes a process model based on the weighted sum of a set of models characterized by disparate dead times. Each of the models in the set generates a prediction of the process output, and the corresponding weight is adjusted automatically as a simple function of the prediction error. The basic concept has been extended to include process gain and dead time variation into the Dahlin controller construct.

In general, the prevalent approaches for designing an adaptive PID adaptive controller are, the direct approach, and the indirect, or identifier-based, approach. As discussed above, the identifier-based approach is effective for control systems utilizing switching strategies and provides an appropriate starting place from which to design an adaptive switching PID controller. It is known to provide an identifier-based, adaptive PID controller coupled with a Recursive Least Squares (RLS) estimator that tracks changes in the model parameters. Typical problems associated with recursive identifiers include difficulty selecting initial parameters, insufficient excitation, filtering, parameter wind-up, and sluggish parameter tracking speed. Because of the complexity of these variables and the difficulty associated with calculating accurate estimate, it is well understood in the art that the performance of the known identifier-based, adaptive PID controller may be improved by simplifying the process model.

An exemplary explanation of a simplified identifier based adapative controller is described by Astrom and Hagglund in "Industrial Adaptive Controllers Based on Frequency Response Techniques," Automatica, Vol. 27, No. 4, pp. 599–609 (1991). Generally, the article discloses a controller designed to perform process model adaptation in the frequency domain, and tuning in response to set-point changes and natural disturbances. More specifically, a tuning frequency is selected by applying band-pass filters to the process input and output, the frequency of the filters is defined by the auto-tuner (tuner-on-demand). The auto-tuner defines the ultimate period using a relay oscillation technique, prior to adaptive tuner operation and the process gain for the tuning frequency using a simplified RLS estimator. The auto-tuner has the capability to track changes in a process gain. However, when a change in a dead time or in a time constant is encountered, the point tracked no longer exhibits a $-\pi$ phase, and controller tuning becomes inaccurate.

Further, it is known to improve tuning by applying several tuning frequencies and using an interpolator to define a frequency with phase $-\pi$. Alternatively, it is possible to apply a single tuning frequency and adjust frequencies after each tuning cycle to track a phase $-\pi$. Both tuner models accommodate subsequent set-point changes and natural disturbances and may inject external excitations at the controller output or at the set-point input. Although such auto-tuners do not exhibit the size and set-up constraints of the previous technique, they are significantly more complex.

Furthermore, both tuner models utilize primitive adaptive models that recognize only two parameters: Ultimate Gain and Ultimate Period. Tuner models incorporating these simple, two-parameter, adaptive models are suitable for Ziegler-Nichols tuning or some analogous modification, but unsuitable for applications where Internal Model Control (IMC) or Lambda tuning are preferred. While a simple RLS identifier may be used to determine static gain for the feedforward control, the RLS indentifier approach does not provide the process feedforward dynamics required for adequate feedforward control. In addition, because feedforward signals are load disturbances, and perturbation signals cannot be injected into the feedback path, the approach suffers the problem of insufficient excitations.

An alternate solution to feedforward adaptation was disclosed by Bristol and Hansen in U.S. Pat. No. 5,043,863, entitled "Multivariable Adaptive Feedforward Controller". This patent discloses a differential equation based process model designed to include load disturbances. The process model is periodically updated based on measured process data, wherein disturbances are characterized by moment relations and control relations that are achieved by projection methods. In general, the derived solution is very complex and requires significant excitations, much the same as the above-described RLS identifier approach. Moreover, the derived solution is suitable only for feedforward control and is inapplicable to an adaptive controller with feedback.

Accordingly, an adaptive controller is desired to address the shortcomings of the known adaptive control methods discussed above. Specifically, an adaptive controller capable of providing a uniform solution for feedback and feedforward adaptive PID control. Salient objectives addressed by the state based adaptive feedback/feedforward PID controller disclosed below include: shorter adaptation time, minimization of constraints imposed on the use of PID tuning rules, simplicity of design, and attainment of adaptation with reduction in process excitation.

SUMMARY

A first embodiment of a state based adaptive PID controller includes a method of adaptively designing a controller in a process control system. According to the method, a set of models for the process is established including a plurality of subsets having a state parameter representative of a disturbance input corresponding to process regions. The subsets may be automatically selected by some pre-defined switching rule. Each of the individual models includes a plurality of parameters, each parameter having a respective value that is selected from a set of predetermined initialization values corresponding to the parameter. Evaluation of the individual models includes a computation of a model-squared error, or norm. The norm is assigned to every parameter represented in the model that is evaluated. As repeated evaluations of models are conducted, an accumulated norm is calculated for each parameter. The accumulated norm is the sum of all norms that have been assigned to the parameter in the course of model evaluations. Subsequently, an adaptive parameter value is calculated for each parameter. The adaptive parameter value is a weighted average of the initialization values assigned to the respective parameters. The controller is then updated in response to the adaptive parameter values.

Another embodiment of the adaptive PID controller includes a system for tuning a process controller. The system may be implemented by either hardware or software, or any desired combination thereof. The system comprises a model set component communicatively coupled to a process and including a state variable defining a plurality of process regions and a plurality of process models grouped into the plurality of process regions. Each of the process models includes a plurality of parameters each having a value selected from a set of predetermined initial values assigned to the respective parameter. Each of the regions includes a set of standard parameter values defined for that region. An error generator is communicatively coupled to the model set component and the process output. The error generator generates a model error signal representative of the difference between the output of the process model and the output of the process. A model evaluation component is communicatively coupled to the error generator for computing a model squared error corresponding to the process model for attributing the model squared error to parameter values represented in the model. A parameter interpolator is communicatively coupled to the model evaluation component for calculating an adaptive process parameter value for parameters represented in the process model. A controller update component has an input coupled to an output of the parameter interpolator and an output coupled to a controller. The controller update component updates adaptive controller parameter values to the controller upon conclusion of an adaptation cycle. The adaptive controller parameter values are derived from the adaptive process parameter values that are calculated.

Another embodiment of a state based adaptive feedback/feedforward controller includes a model component coupled to a process and having a plurality of process models, wherein each of the models includes a plurality of parameters having a value selected from a set of predetermined initial values assigned to the respective parameter. A state variable describes the change or measured disturbance of a process variable, defines at least one process region including a subset of the process models, and corresponds to a set of region initial parameters representative of the process region. An error generator generates a model error signal that represents the difference between a model component output signal and a process output signal and a model evaluation component computes a model squared error corresponding to the model and for attributes the model squared error to parameter values represented in the model.

A parameter interpolator calculates an adaptive parameter value for at least one of the plurality of parameter values represented in the model and a controller update component updates a controller parameter value within the controller upon conclusion of an adaptation cycle.

It will be understood that, depending on individual process requirements, not all process parameters will be subject to adaptation in a given adaptation cycle. Limited adaptation may be desired when there is reason to believe that only one, or at least not all, the process parameters have changed. For example, empirical evidence may show that in a given time period (e.g. the elapsed time between adaptation cycles) the process Gain parameter may vary while the remaining parameter may remain substantially constant. In this scenario, a process supervisor, described below, may initiate a limited by causing only the process Gain parameter to be adapted. The process controller is then updated in response to the adapted process Gain parameter. The feedback/feedforward controller may also include a method of adaptive controller whereby, as above, a model set is compiled for the process, and each of the models is evaluated by determining a unique model squared error for each model. An adaptive (Gain) parameter value is calculated based on the weighted sum of each of the predetermined initialization parameter values. The initialization values are weighted by Normalized Fitness factors. With an adaptive process (Gain) parameter calculated, the controller is updated accordingly.

BRIEF DESCRIPTION OF THE DRAWINGS

FIG. 3 also depicts a suggested sequence in which to conduct a model scan.

DETAILED DESCRIPTION

Figure 1:
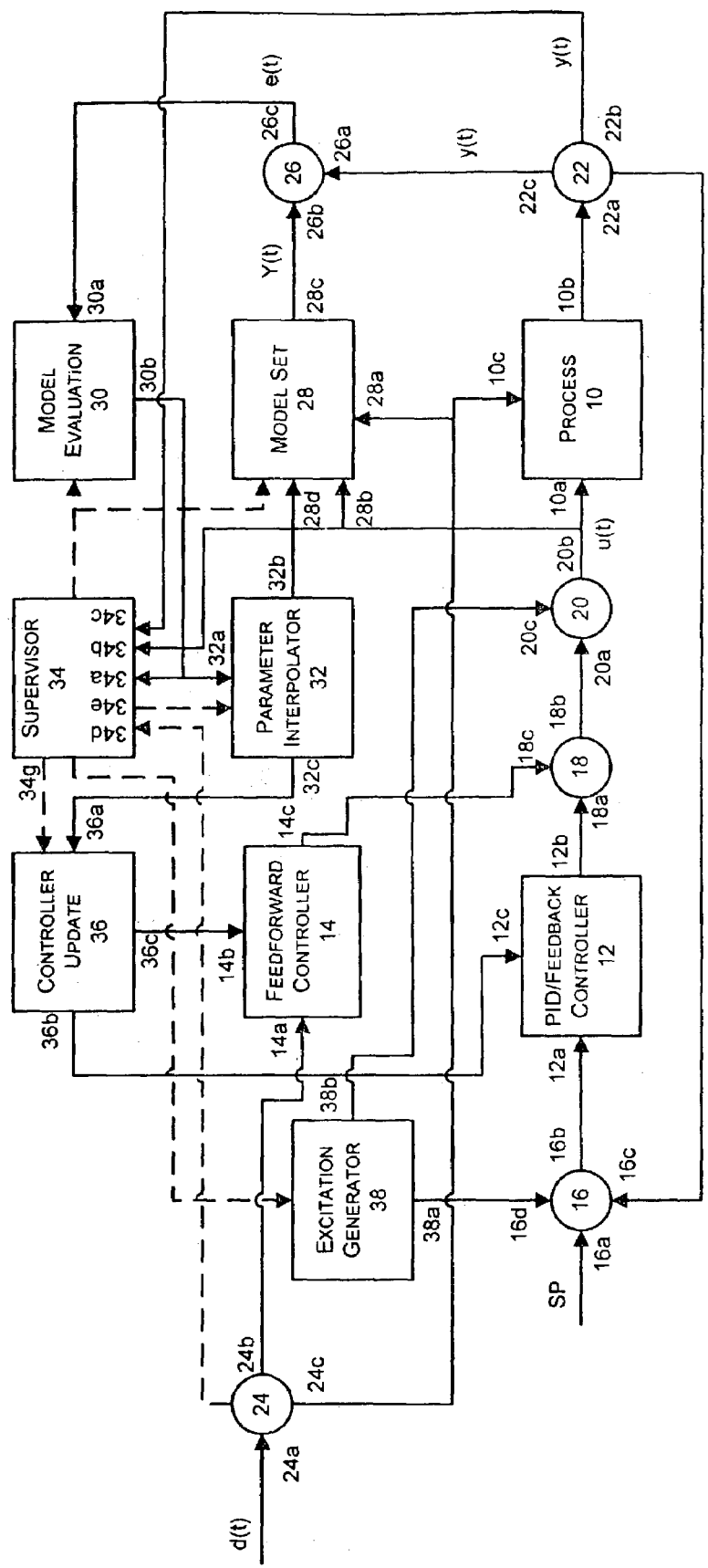
FIG. 1 is a functional block diagram of an adaptive feedback/feedforward PID controller, the operation which is based on interpolation of process model parameters.

FIG. 1 illustrates an exemplary adaptive feedback/feedforward (FB/FC) PID controller used to control a process 10. The general operation of such systems is well known by those skilled in the art. See, for example, F. G. Shinskey, Process Control Systems: *Application, Design and Tuning*, 4$^{th}$ ed., McGraw-Hill, New York, 1996. The adaptive control system illustrated in FIG. 1 includes a PID controller 12 incorporating a feedback (FBC) controller, and a separate feedforward (FFC) controller 14.

The process control system may be conveniently described with reference to an FBC input node 16, of FBC output node 18, a process input node 20, a process output node 22, a feedforward controller (FFC) input node 24, and an error node 26. In a manner familiar to those skilled in the art, a process set-point signal, SP, is applied to a first input of FBC input node 16, indicated by the numeral 16a. An output 16b of FBC input node 16 is coupled to an input 12a of the PID controller 12. An output 12b of the PID controller 12 is coupled to a first input 18a of the FBC output node 18.

An output 18b of the FBC output node 18 is coupled to a first input 20a of the process input node 20. An output 20b of the process input node 20 is coupled to a first input 10a of the process 10. An output 10b of the process 10 is coupled to an input 22a of the process output node 22. A first output 22b of the process output node 22 is fed back to a second input 16c of FBC input node 16. A second output 22c of process output node 22 is coupled to a first input 26a of the error node 26. FIG. 1 further illustrates, the input signal to process 10 can, for example, be referred to as u(t), and the output signal of process 10 can be referred to as y(t). (Strictly speaking, u(t) and y(t) are electrical representations of the physical phenomena that arise in connection with the process.) In addition, a disturbance signal, d(t), appears at an input 24a of the FFC input node 24. The disturbance signal d(t) is coupled from a first output 24b of the FFC input node 24 to an input 14a of FFC 14 and propagates from a second output 24c of the FFC input node 45 to a second input 10c of the process 10. An output 14c of FFC 14 is coupled to an input 18c of the FBC output node 18.

The format and layout of the exemplary feedback/feedforward PID process control system described above will be well understood by a person of ordinary skill in the art. The additional functional components illustrated in FIG. 1 describe an exemplary adaptive feedback/feedforward PID controller. Specifically, a model set component 28 includes signal inputs 28a and 28b respectively coupled to the disturbance signal d(t) and to process input signal u(t). The constituents of the model set component 28 are a set of mathematical models representative of the process 10. The output 28c of the model set component 28 is coupled to the input 26b of the error node 26. An output 26c of the error node 26 is coupled to an input 30a of a model evaluation component 30. The model evaluation component 30 includes a simulator (not shown), which may be a software program, that simulates the process 10, as defined by the process parameter values delivered by the model set component 28. The model evaluation component 30 further includes a centering routine (not shown) to calculate and compensate for a parameter estimate offset by defining a numerical offset and recentering the models used in the next evaluation based on the numerical offset. An output 30b of the model evaluation component 30 is coupled to an input 32a of a parameter interpolator component 32 and to an input 34a of a supervisor component 34. An output 32b of parameter interpolator 32 is coupled to an input 28d of the model set component 28, and an output 32c of the parameter interpolator 32 is coupled to an input 36a of a controller update component 36. The controller update component 36 has a first output 36b coupled to a second input 12c of the FBC 12 and a second output 36c is coupled to an input 14b of the FFC 14. An in-depth description of the operation and significance of the components 28, 30, 34, 36, and 32 follows.

In operation, the exemplary adaptive feedback/feedforward PID controller, including the components 28, 30, 34, 36, and 32, operates generally as discussed below. The adaptive feedback/feedforward PID control system is mathematically described by a model in the model set 28. Each individual model in the model set 28 is defined by predetermined parameters intended to replicate, in a limited fashion, the process 10. In general, each of the models within the model set 28 may be defined by a number of parameters, m, and each of the parameters may be assigned a number of values, n. Therefore the total number of models in the model set 28 is equal to N, where $N=m^n$. In an exemplary embodiment of the invention, the models may be characterized by the parameters dead time (DT), time constant (Tc) and Gain. Furthermore, each of the parameters will be assumed to have been assigned one of three values: Dead Time=DT+, DT, DT−; Time Constant=Tc+, Tc, or Tc−; and Gain=Gain+, Gain, and Gain−. Therefore, the total number of models available to mathematically approximate the process 10 is $N=3^3=27$. Each of the models will be individually referred to as $Mod_i$, where i=1, . . . , 27.

At, or prior to, the initiation of a model evaluation scan, parameter interpolator 32 provides a set of predetermined initialization parameter values to model set component 28. Again, if three parameters, DT, Tc and Gain are assumed, and if each of the parameters has three predetermined initialization parameter values, the parameter interpolator 32 will provide nine parameter values to the model set component 28. Parameter values may be established in any known manner, and at the discretion of the controller design. In general, the parameter values written to the model set 28, at the beginning of an adaptation cycle, are based on the adaptive parameter values computed during the most recent adaptation cycle. In response to the nine parameter values, and under the control of the supervisor 34, the model set component 28 constructs a total of 27 models, $Mod_i$, where i=1, . . . , 27. The supervisor 34, during the model evaluation scan, sequentially selects and activates a model $Mod_i$, and applies the process input u(t), received via the input 28b, to the activated model $Mod_i$. The resultant output of the activated model Mod is then communicated to the error generator node 26 via the model set output 28c.

Figures 1A, 1B:
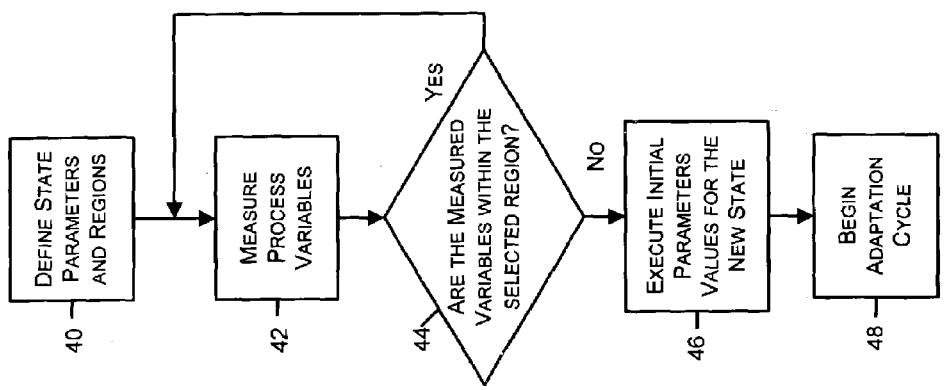
FIG. 1A is a functional block diagram of a Model Set element operating within the adaptive feedback/feedforward PID controller.
FIG. 1B is a flow diagram of an embodiment of the adaptive feedback/feedforward PID controller.

FIG. 1A graphically illustrates an exemplary model set 28 including a state variable $S_i$ configured to include a plurality of regions. The state variable $S_i$, where i=1, . . . , n and n identifies the number of defined states, represents the measured process disturbance descriptive of the gain or dynamics associated with the measured process input-output. The state variable $S_i$ is generally based on process variables which may be, among other things, a change in the disturbance signal d(t), the set-point SP, a signal generated by an excitation generator 38, and/or any other process input or output. The state variable $S_i$ may be developed within a state development routine operating within the model set 28 as a function of one or more of the process variables d(t), u(t), y(t), Y(t), e(t) and SP. It should be noted that the state development routine may be executed in any component or sub-component of the control system as long as the routine has access to the stored or real-time process variable of interest. The state variable $S_i$ may further be predetermined or user-defined values assigned to generally describe a range or region into which the models $Mod_i$ may be grouped.

The region defined by the state variable $S_i$ includes a plurality of initial parameter values predetermined to characterize the typical operation of the region. The defined region, during the controller design procedure, may be established to insure that the model $Mod_i$ remains substantially constant throughout the range of the state variable. In operation and prior to beginning an adaptation cycle, when the measured process disturbance changes from a first state (e.g. $S_1$) to a second state (e.g. $S_2$) the parameter values associated with state $S_1$ may be immediately exchanged with the parameter values associated with state $S_2$ thereby increasing the performance of the PID controller 12 and/or the feedforward controller 14 in a particular region.

FIG. 1B illustrates an exemplary flow diagram of the operation of the adaptive feedback/feedforward PID controller. As discussed above, during the initial set-up and design of the controller, the range of the state variable $S_i$ can be defined, as shown in block 40. The total state range can be thought of as the range in which the changed in the process variable or the measured disturbance input can be expected to experience. The range $S_i$, in turn, is a region of the total range in which the process model is determined to be substantially constant or predictable. The change in the disturbance input, caused by the excitation generator 38, the disturbance signal d(t) and/or the set-point SP is then measured, as shown in block 42. As shown in block 44, the measured change in the process variables is then compared to the current range $S_i$ to determine if the disturbance input is within the selected region. If the disturbance input is within the selected region, the process continues to measure the change in disturbances. However, if the disturbance input is within a new range $S_j$ then the initial parameter values for that state $S_j$ are loaded and used by the feedback controller 12 and/or feedforward controller 14, as shown in block 46.

The initial or typical parameter values defined for each range or state $S_i$ may be based on the average parameter values measured or calculated within the range or they may be manually input by a controller designer. The typical parameter values may further be used as a reference value in conjunction with a maximum change or delta value to limit the amount of permissible change experienced by the calculated parameter value in any given adaptation cycle. Stated another way, the controller designer may define a maximum change value to limit the calculated decrease and/or increase of the parameter value in response to an anomalous disturbance signal. Upon completion of the controller with the initial parameters for state $S_j$, the adaptation cycle may be executed, as shown in block 48. The adaptation cycle 48, as discussed in more detail below, customizes the model $Mod_i$ by determining adaptive parameter values responsive to the measured change of the process 10.

Another embodiment of the adaptive feedback/feedforward PID controller may include a state variable having a null value that equates to a disabled setting. Typically, the state variable will have a null value when there exists no input disturbance signal, indicative of the state process, to be measured.

Referring again to FIG. 1, the output signal of the model set 28, identified by the variable Y(t), and the concurrent output of the process 10, identified by the variable y(t), are delivered to the error generator node 26. The output 26c of error generator node 26, error signal e(t), is coupled to the input 30a of the model evaluation component 30. The error signal e(t) is the difference between the process output y(t) and the output of model $Mod_i$ Y(t) at time t. In a manner to be fully explained below, the model evaluation component 30 computes a model squared error corresponding to each model $Mod_i$ and assigns the model squared error to parameter values represented in the model $Mod_i$.

The output 30b of the model evaluator 30 is communicated to the input 32a of the parameter interpolator 32. The parameter interpolator 32 calculates an adaptive parameter value for parameters represented in the model $Mod_i$. The output 32b of the parameter interpolator 32 is coupled to the model set 28, and the output 32c of the parameter interpolator 32 may be coupled to the input 36a of the controller update component 36. The output 36b is applied to the PID controller 12 and the output 36c is applied to the feedforward controller 14. The controller update component 36 communicates adaptive parameter values to the PID controller 12 and the feedforward controller 14 at the completion of an adaptation cycle. FIG. 1 further illustrates an excitation generator component 38 having an output 38a coupled to the input 16d of the input node 16. The excitation generator 38 includes an output 38b coupled to an input 20c of the process input node 20.

The supervisor component 34 has a plurality of signal inputs 34b, 34c, 34d respectively coupled to the process input signal u(t), to the process output signal y(t), and to the disturbance signal d(t). The supervisor component 34 further includes an input 34a coupled to the output 30b of the model evaluation component 30. The supervisor 34 includes a first control output 34e coupled to parameter interpolator component 32, a second control output 34f coupled to the model evaluation component 30, and a third control output 34g coupled to the controller update component 36. In addition to performing other functions, the supervisor component 34 operates to detect changes in the process output y(t), changes in the process input u(t) from the PID controller 12, and changes in the disturbance (feedforward) input d(t). When a change in the magnitude of any of these signals y(t), u(t) and d(t) exceeds a predetermined minimum or threshold level, the supervisor 34 initiates the adaptation cycle. The supervisor 34 is communicatively connected to the various elements of the control system 28, 30, 32, 36, 38 and 24, as shown by the dashed lines in FIG. 1, and is therefore able to determine the status of the individual elements operating within the control system. An exemplary embodiment of the model evaluation may comprise the following steps:

(1) Identify and initiate the model state;
(2) model initiation and adjustment of model output to current process output;
(3) incremental update of model based on specifications in the u(t) and/or d(t) signals and
(4) computation of model squared error or other norms such as the absolute value of the error.

Specifically, the process of adaptation of the feedback/feedforward PID is based on the application of interpolative techniques to model parameter values. In this exemplary embodiment of the device, the model squared error, $E_i(t)$ may be defined, for each model in a scan, by the equation:

$$E_i(t) = (y(t) - Y_i(t))^2 \quad \text{[Equation 1]}$$

where:
y(t) is the process output at the time t,
$Y_i(t)$ is the output of model $Mod_i$ at time t,
$E_i(t)$ is the squared error attributed to $Mod_i$, and
$E(t) = [E_1(t), E_i(t), \ldots, E_n(t)]$ is the squared error vector for $Mod_i$, where i=1, . . . , N at time t.

The model squared error $E_i(t)$ is assigned to every parameter value of the model $Mod_i$, provided that the parameter value is represented in the evaluated $Mod_i$. If a specific parameter value is not represented in the evaluated model, the parameter value may be assigned zero or a null value. Iteratively, the $Mod_{i+1}$ is evaluated, and a model squared error $E_{i+1}(t)$ is computed for the evaluated model. The computed model squared error is assigned to every parameter value of the $Mod_i$. As $E_i(t)$ is calculated during each model evaluation, and assigned to the parameter values represented in the respective models, an accumulated total of assigned model squared errors is maintained for each parameter value. The process evaluation iterates until all models, i=1, . . . , N, are evaluated. A complete sequence, where each model $Mod_i$ is evaluated once, and a corresponding model squared error, $E_i(t)$, is calculated, is referred to as a model scan. As a result of this sequence of evaluations, or model scan, each parameter value has assigned a sum of squared errors from all models in which the specific parameter value has been used. Therefore, as a result of every model scan, each parameter value, $p^{kl}$, where k=1, . . . , m and l=1, . . . , n will be assigned a Norm:

$$E_p^{kl}(t) = \sum_{i=1}^{N} X_{kl} E_i(t) \quad \text{[Equation 2]}$$

where:
$Ep^{kl}(t)$ is the Norm assigned to the parameter value $p^{kl}$ as a result of scan t,
N is the total number of models, and
$X_{kl}=1$ if parameter value $p^{kl}$ is used in the $Mod_i$, and $X_{kl}=0$, if parameter value $p^{kl}$ is not used in the $Mod_i$.

The evaluation process is repeated in the next scan and a Norm $Ep^{kl}(t)$ resulting from sum of the squared errors $E_i(t)$ assigned during that scan is combined with the Norm values computed during the prior scan(s). The repeated sequences of model scans is collectively referred to as an adaptation cycle and continues, under control of the supervisor 34, until a predetermined number of scans is completed, or until there has occurred an adequate number of excitations to the process input, whichever condition is satisfied first.

As a result of this procedure, every parameter value $p^{kl}$ has assigned an accumulated value of the Norm determined during an adaptation cycle:

$$\text{sum} Ep^{kl}(t) = \sum_{i=1}^{M} Ep^{kl}(t). \quad \text{[Equation 3]}$$

At the end of the adaptation cycle, the inverse of the sum is calculated for every parameter value $p^{kl}$:

$$Fkl = \frac{1}{\text{sum}Ep^{kl}} \quad \text{[Equation 4]}$$

In as much as Fkl is the inverse of the sum of the model squared errors, the variable Fkl may be intuitively seen as a measure of the Fitness of the parameter value. Then, for every parameter $p^k$, there is calculated an adaptive parameter value $p^k(a)$ that is a weighted average of all values of this parameter:

$$p^k(a) = p^{k1} * fk1 + \ldots + p^{kl} * fkl + \ldots + p^{kn} * fkn, \quad \text{[Equation 5]}$$

where:

$$\text{relative fitness } fkl = \frac{Fkl}{\text{sum}Fkl} \quad \text{[Equation 6]}$$

$$\text{sum}FK = Fk1 + \ldots + Fkl + \ldots + Fkn \quad \text{[Equation 7]}$$

Accordingly, each factor fkl may be viewed as a corresponding to normalized fitness for the respective parameter value.

The adaptive parameter values, as calculated above, define a new model set, with center parameter values $p^k(a)$, k=1, . . . m, and range of parameter values between upper and lower bounds, to be assumed in the design. The range of changes defined as +Δ% to −Δ%, and should be represented by two or more additional parameter values. For example, if the adaptation cycle yields the adaptive parameter value $p^k(a)$ then it is necessary to define at least two additional parameters that assume the value $p^k(a)[1+\Delta\%]$, and the value $p^k(a)[1-\Delta\%]$, for the new model evaluation. In other words, each parameter has defined lower and upper bounds for adaptation such that the values $p^k(a)$ is limited to the bound value. As soon as a model has been updated, that is, upon completion of an adaptation cycle, controller update takes place based on the updated $p^k(a)$, k=1, . . . , m model parameter values. Adaptation may be applied to the entire model or may be limited to the PID/feedback or feedforward portion of the model, e.g. the portion of the model that relates the output with the inputs when predetermined minimum excitation level are realized. In addition, external excitations may be injected into feedback loop, via the excitation generator 38 operating under the control of the supervisor 34, in situations where inadequate excitation fails are realized within the control system.

Adaptation may further be implemented in a sequential manner, for example, a single parameter value which may be DT can be adapted while the remaining parameter (e.g. Tc and Gain) are held constant. In this manner each parameter can be adapted while hold the remaining parameters, which may or may not have been adapted in previous adaptation cycles, constant. Sequential adaptation methods advantageously provide for faster convergence on the desired an adaptive parameter value $p^k(a)$.

Figure 2:
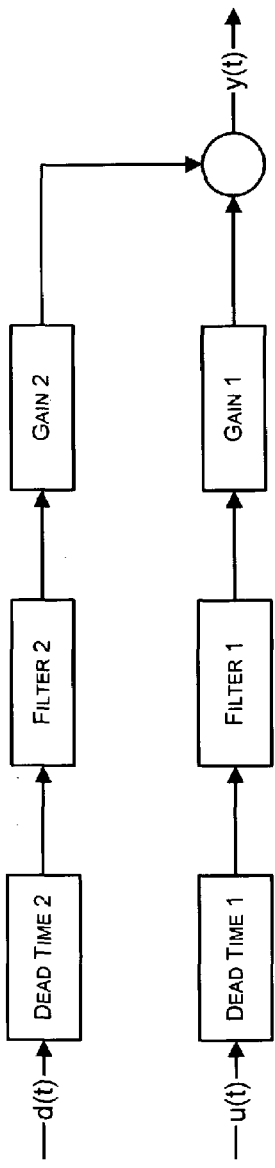
FIG. 2 is a conceptual depiction of a first-order-plus-deadtime process model that includes both feedback/feedforward loops.
Figure 3:
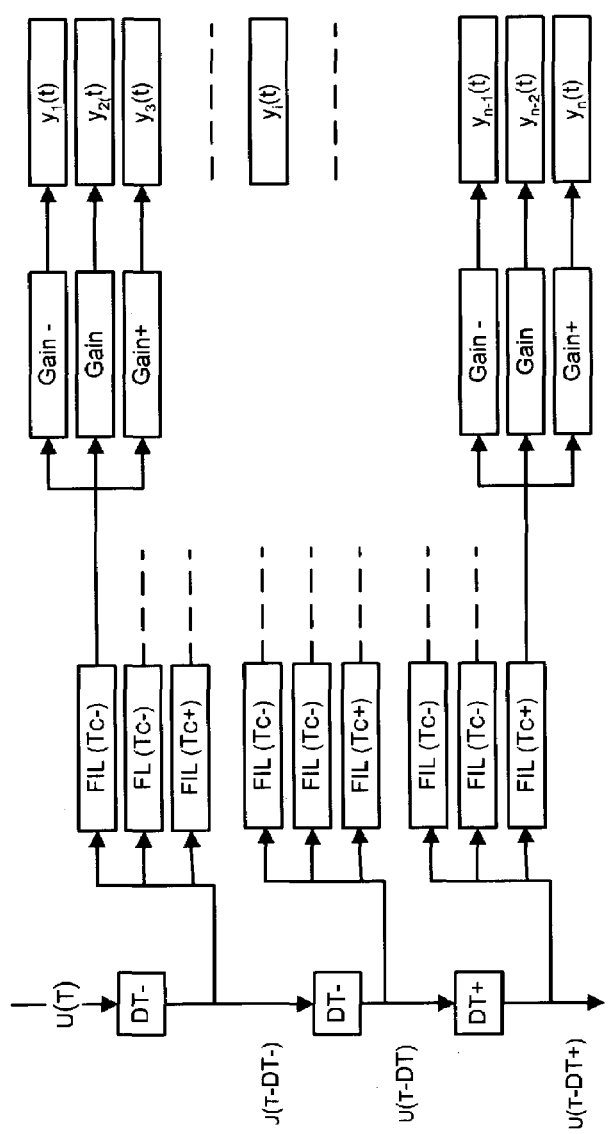
FIG. 3 is a depiction of a model set characterized by three parameters, DT, Tc and Gain, each of which may assume one of three values.

FIG. 2 illustrates an exemplary adaptive parameter interpolation procedure including a first order plus dead time process model for the feedback and feedforward control loops. For this particular example, assume three values are defined for every parameter and the adaptation range predetermined to be (+Δ%) to (−Δ%) in one cycle. Then for every process input u(t) and disturbance d(t) there is encountered the model set depicted in FIG. 3. In FIG. 3:
DT is the central value of the Dead Time parameter;
(DT−) is (DT−Δ%);
(DT+) is (DT+Δ%);
Tc is the central value of the Time Constant parameter;
(Tc−) is (Tc−Δ%);
(Tc+) is (Tc+Δ%);
Gain is the central value of the Gain parameter;
(Gain−) is (Gain−Δ%); and
(Gain+) is (Gain+Δ%).

The number of switching combinations resulting from the configuration of FIG. 3 is 3×3×3=27. However, if both inputs in the model of FIG. 2 are used for adaptation, the number of switching combinations increases to $27^2$=729. These model combinations, while significant in number, requires only three values for each parameter which simplifies the model computations. Simplified model computations are achieved because the controller adaptation is driven by parameter evaluation, rather than model evaluation. Therefore, it is necessary to perform adaptation based on nine parameter values in the feedback loop and nine parameter values in the feedforward loop. Consequently, the number of parameters evaluated in the disclosed adaptation procedure varies proportionally to the number of parameters, as opposed to the exponential variation experienced in the prior art model evaluation technique.

The computation requirements may be limited by controlling the sequence in which the parameter values are imparted to the model. For example, a parameter with memory, such as Dead Time, may be imparted before a memoryless parameter, such as Gain. Thus, an exemplary sequence, as illustrated in FIG. 3, is Dead Time (DT), Time Constant (Tc), and then Gain.

After comparing every model output with current process output, a table of the sum of squared errors may be constructed. Upon completion of the adaptation cycle, an adaptive parameter value for every parameter may be calculated, as shown in Table 1.

TABLE 1

First-order Plus Dead Time Adaptive Process Model Interpolation

| | Parameter Value | Squared Error (SE) | Inverse SE | Adaptive Parameter Value |
|---|---|---|---|---|
| Dead Time | DT−, DT, DT+ | Eqs. (1), (2), (3) | Eqs. (6), (7) | Eq. (5) |
| Lag | Tc−, Tc, TC+ | | | |
| Gain | Gain−, Gain, Gain+ | | | |

Once the model adaptation cycle has been completed, and the adaptive parameter values established in accordance with the above Table 1, controller update is affected through the operation of controller update component 36. Essentially, the controller update component 36 maps the newly calculated adaptive process parameter values $p^k(a)$ to update values for the parameters that characterize PID controller 12 and/or to feedforward controller 14. For example, the process parameters DT, Tc and Gain may be mapped into controller parameters Reset, Rate and Gain. Because a complete first order plus dead time process model is described, any known tuning rule can be applied, including Lambda or NC tuning. For the feedforward path, the dynamic feedforward controller design equation has been shown to be applicable:

$$G_{ff} = -\frac{Kd}{Ku}\frac{1+sTu}{1+sTd} \qquad \text{[Equation 8]}$$

where:
$G_{ff}$=Feedforward Controller transfer function,
Kd=Static Gain of the feedforward process dynamics,
Ku=Static Gain of the feedback process dynamics,
Td=Time Constant of the feedforward process dynamics, and
Tu=Time Constant of the feedback process dynamics.

In summary, the adaptive feedback/feedforward controller that has been described above represents a substantial enhancement of auto-tuning techniques in a scalable process control system.

Although the invention has been described with reference to the specific exemplary embodiments intended to instruct and illustrate the invention, the disclosed adaptive feedback/feedforward controller is not limited to those embodiments. Various modifications, improvements and additions may be implemented by those with shall in the art, and such modifications, improvements, and additions will not depart from the scope of the invention, as defined by the appended claims.

For example, as described above, controller adaptation is predicated on statistical interpolation of parameters used to construct a mathematical model of the process under control. Although the process is characterized by three parameters, DT, Tc and Gain, and each of those parameters is assigned three values, the disclosed adaptive feedback/feedforward controller clearly extends to other, and/or a different number of, parameters, each potentially encompassing a different number of assigned values. In addition, the model evaluation and parameter interpolation have been illustrated as individual components identified as the model set 28, the models evaluator 30, the supervisor 34, the parameter interpolator 34, and the controller update 36. Those skilled in the art will understand that the partitioning of individual components is discretionary to those responsible for controller implementation and operation. Similarly, the functions of the disclosed system is susceptible to implementation by either hardware or software, or a combination of the two. Variations of that nature are to be deemed equivalent.

It is recognized that such specific approaches represent but an insubstantial deviation from the embodiments of the invention described above. Consequently, the claims below are properly construed to embrace all modifications, variations and improvements that fall within the true spirit and scope of the invention, as well as substantial equivalents thereof. Accordingly, other embodiments of the invention, though not described with particularly herein, are nonetheless comprehended with the scope of the invention, as defined by the claims below.

What is claimed is:

1. A method of automatically switching an adaptive PID controller comprising:

defining a model set having a plurality of individual models representative of a controlled process, wherein each of the models includes a plurality of parameter values;

defining a plurality of model subsets within the model set; wherein each of the model subsets includes a state parameter representative of a process variable input and a plurality of initial parameter values representative of the model subset;

determining the state parameter and updating the PID controller with the plurality of initial parameter values associated with the state parameter;

evaluating each of the models in the model subset corresponding to the state parameter and calculating a model squared error for each model;

determining an adaptive parameter value as a function of the model squared error; and updating the PID controller in response to the adaptive parameter value.

2. The method of automatically switching an adaptive PID controller as defined in claim 1, wherein the adaptive parameter values define a parameter model set including a center parameter value, an upper bound parameter value, and a lower bound parameter value.

3. The method of automatically switching an adaptive PID controller as defined in claim 2 wherein the upper bound parameter value is offset from the center parameter value by $+\Delta\%$ and the lower bound parameter value is offset from the center parameter value by $-\Delta\%$.

4. The method of automatically switching an adaptive PID controller as defined in claim 2 wherein the center parameter value is set equal to the adaptive parameter value upon the conclusion of an adaptation cycle.

5. The method of automatically switching an adaptive PID controller as defined in claim 2, wherein the model squared error, $E_f(t)=(y(t)-Y_f(t))^2$, for the model, $Mod_f$, is determined by squaring the difference between the process output at a given time, $y(t)$, and the model output at that time, $Y_f(t)$.

6. The method of automatically switching an adaptive PID controller as defined in claim 1, wherein evaluating each of the models in the model subset further includes:

(i) performing a first evaluation scan on a first model set and determining, for each model in the first model set, the difference between an instantaneous process output and a model output during the first evaluation scan and computing a first Norm based on the determined difference;

(ii) performing a second evaluation scan on the first model set and determining, for each model in the first model set, the difference between the instantaneous process output and the model output during the second evaluation scan and computing a second Norm based on the determined difference;

(iii) computing an aggregate Norm by summing the second Norm for each parameter value and the first Norm for each parameter;

(iv) performing additional evaluation scans on each of the models to determine at least one additional Norm for each parameter and summing the additional Norm to the corresponding aggregate Norm to determine a final Norm at the end of an adaptation cycle;

(v) computing an adaptive parameter value for each parameter value that is weighted by the sum of the final Norm for all values of the parameter divided by the final Norm computed for the respective parameter value.

7. The method of automatically switching an adaptive PID controller as defined in claim 1, wherein a model squared error, $E_f(t)$, is computed as $E_f(t)=(y(t)-Y_f(t))^2$, where $y(t)$ is the process output at a particular time and $Y_f(t)$ is the model output at that time.

8. The method of automatically switching an adaptive PID controller as defined in claim 1, Wherein an adaptation cycle is initiated by evaluating the value of the state parameter corresponding to a disturbance measured in a process variable.

9. The method of automatically switching an adaptive PID controller as defined in claim 8, wherein disturbance measured in the process variable is detected in a process output signal $y(t)$.

10. The method of automatically switching an adaptive PID controller as defined in claim 8, wherein disturbance measured in the process variable is detected in a process input signal.

11. The method of automatically switching an adaptive PID controller as defined in claim 1, wherein a Norm is assigned to each model parameter value represented in a model, wherein the Norm is the sum of the model squared errors that are computed in the course of the evaluation of each of the models.

12. The method of automatically switching an adaptive PID controller as defined in claim 1, wherein the parameters of the process model include an adaptive memory parameter and an adaptive memoryless parameter, and wherein the controller is updated in response to the adaptive memory parameter before being updated in response to the adaptive memoryless parameter.

13. The method of automatically switching an adaptive PID controller as defined in claim 1, wherein the plurality of parameter initial values include initial values having a center parameter value, an upper bound parameter value, and a lower bound parameter value.

14. The method of automatically switching an adaptive PID controller as defined in claim 13, wherein the upper bound parameter value is offset from the center parameter value by $+\Delta\%$ and the lower bound parameter value is offset from the center parameter value by $-\Delta\%$.

15. The method of automatically switching an adaptive PID controller as defined in claim 1, wherein the adaptive parameter includes a center parameter that is set equal to the adaptive parameter value determined at the conclusion of an adaptation cycle.

16. The method of automatically switching an adaptive PID controller as defined in claim 1, wherein the adaptive parameter values are determine in a sequential manner.

17. The method of automatically switching an adaptive PID controller as defined in claim 16, wherein a subset of the adaptive parameters values are held constant while the remaining adaptive parameter value is adapted.

18. A system for adaptively tuning a process controller, the system comprising:
   a model set component communicatively coupled to a process input, the model set component including a state variable defining a plurality of process regions, and a plurality of models grouped into the plurality of process regions, each of the grouped models includes a plurality of parameters having a value selected from a set of predetermined initial values assigned to the respective parameter;
   an error generator communicatively coupled to the model set component and a process output, the error generator configured to generate a model error signal representative of the difference between a model output signal and a process output signal;
   a model evaluation component communicatively coupled to the error generator for computing a model squared error corresponding to a model and correlating the model squared error to parameter values represented in the model;
   a parameter interpolator communicatively coupled to the model evaluation component for calculating a respective adaptive parameter value for parameters represented in the model; and
   a controller update component communicatively coupled to the parameter interpolator and a process controller, the controller update component for updating the process controller in response to adaptive parameter values upon conclusion of an adaptation cycle.

19. The system for adaptively tuning a process controller as defined in claim 18, further comprising a supervisor component communicatively coupled to the process for initiating model evaluation when a change in a process input or a process output exceeds a respective threshold level.

20. The system for adaptively tuning a process controller as defined in claim 19, wherein the supervisor component is communicatively coupled to a feedforward input for initiating model evaluation when a change in a disturbance input exceeds a threshold level.

21. The system for adaptively tuning a process controller as defined in claim 18, wherein the set of predetermined initial values for each parameter includes a center parameter value, an upper-bound parameter value and a lower-bound parameter value.

22. The system for adaptively tuning a process controller as defined in claim 18, wherein the model evaluation component computes a model squared error, $E_i(t)$, equal to $(y(t)-Y_i(t))^2$, corresponding to a model $Mod_i$, where $y(t)$ is the process output at a given time and $Y_1(t)$ is the output of model $Mod_i$ at that time.

23. The system for adaptively tuning a process controller as defined in claim 21, wherein the model evaluation component assigns a Norm to each model parameter value, which Norm is equal to the sum of the model squared errors computed in the evaluation of each of the models in which the parameter value is represented.

24. The system for adaptively tuning a process controller as defined in claim 23, wherein the adaptive parameter value calculated by the parameter interpolator is calculated as a sum of weighted parameter values.

25. The system for adaptively tuning a process controller as defined in claim 24, wherein the weighting factor applied to each parameter value is proportional to the sum of the Norms computed for all values of the parameter and is inversely proportional to the Norm computed for that value of the parameter.

26. The system for adaptively tuning a process controller as defined in claim 25, wherein the weighting factor applied to each parameter value is equal to the sum of the Norms computed for all values of the parameter, divided by the Norm computed for the respective parameter value.

27. The system for adaptively tuning a process controller as defined in claim 18, wherein the models component comprises a plurality of feedback controller models and a plurality of feedforward controller models.

28. The system for adaptively tuning a process controller as defined in claim 27, wherein the parameter interpolator comprises a feedback controller parameter interpolator and a feedforward controller feedback interpolator.

29. The system for adaptively tuning a process controller as defined in claim 28, wherein the controller update component is communicatively coupled to a feedback controller for updating feedback controller parameter values to the feedback controller and to a feedforward controller for updating feedforward controller parameter values to a feedforward controller.

30. A state based adaptive feedback/feedforward controller comprising:
   a model component coupled to a process and having a plurality of process models, wherein each of the models includes a plurality of parameters having a value selected from a set of predetermined initial values assigned to the respective parameter;
   a state variable describing the change of a process variable, the state variable defining at least one process region including a subset of the process models, the state variable corresponding to a set of region initial parameters representative of the process region;
   an error generator for generating a model error signal that represents the difference between a model component output signal and a process output signal;
   a model evaluation component for computing a model squared error corresponding to the model and for attributing the model squared error to parameter values represented in the model;
   a parameter interpolator for calculating an adaptive parameter value for at least one of the plurality of parameter values represented in the model; and
   a controller update component for updating a controller parameter value within the controller upon conclusion of an adaptation cycle.

31. The state based adaptive feedback/feedforward controller as defined in claim 30, further comprising a supervisor component for initiating the model evaluation when a change in the measure disturbance exceeds a respective threshold level.

32. The state based adaptive feedback/feedforward controller as defined in claim 30, wherein the predetermined initial values for each parameter include a center parameter value, an upper-bound parameter value and a lower-bound parameter value.

33. The state based adaptive feedback/feedforward controller as defined in claim 30, wherein the evaluation component computes a model squared error, $E_1(t)$, equal to $(y(t)-Y_1(t))^2$, corresponding to a model $Mod_i$, where $y(t)$ is the process output at a given time and $Y_1(t)$ is the output of model $Mod_i$ at that time.

34. The state based adaptive feedback/feedforward controller as defined in claim 30, wherein the adaptive parameter value calculated by the parameter interpolator component is calculated as a sum of weighted parameter values.

35. The state based adaptive feedback/feedforward controller as defined in claim 34, wherein the weighting factor applied to each parameter value is proportional to the sum of a Norm computed for all values of the parameter and is inversely proportional to the Norm computed for that value of the parameter.

36. The state based adaptive feedback/feedforward controller as defined in claim 30, wherein the process variable is a disturbance signal.

37. The state based adaptive feedback/feedforward controller as defined in claim 30, wherein the process variable is a change in a process set point.

38. The state based adaptive feedback/feedforward controller as defined in claim 30, wherein the process variable is a change in the process output signal.

39. The state based adaptive feedback/feedforward controller as defined in claim 30, wherein the parameter interpolator includes an adaptation limit for limiting the calculated change for the at least one of the plurality of parameter values.

* * * * *

UNITED STATES PATENT AND TRADEMARK OFFICE
CERTIFICATE OF CORRECTION

PATENT NO. : 7,113,834 B2
APPLICATION NO. : 10/419582
DATED : September 26, 2006
INVENTOR(S) : Wilhelm K. Wojsznis et al.

It is certified that error appears in the above-identified patent and that said Letters Patent is hereby corrected as shown below:

On Page 2:

At field (56), Other Publications, right Column of page 2, 7$^{th}$ cited reference, "Narendra" should be -- Narendra, --.

At field (56), Other Publications, right Column of page 2, 3$^{rd}$ cited reference, "afor" should be -- for --.

In the Specification:

At Column 1, line 10, "is of" should be --of--.

At Column 5, line 16, "limited by" should be --limited adaptation by--.

At Column 7, line 28, "Mod" should be --$Mod_i$--.

At Column 8, lines 1, "changed" should be --change--.

At Column 10, Equation 2, "$E^{kl}_p(t)$" should be --$Ep^{kl}(t)$--.

At Column 11, line 14, "level" should be --levels--.

At Column 11, line 23, "hold" should be --holding--.

At Column 11, lines 26-27, "desired an adaptive" should be --desired adaptive--.

At Column 11, line 50, "requires" should be --require--.

At Column 12, line 56, "shall" should be --skill--.

At Column 13, line 9, "is susceptible" should be --are susceptible--.

At Column 13, line 20, "particularly" should be --particularity--.

In the Claims:

At Column 13, line 62, "$E_i(t)=(y(t)-Y_i(t))^2$" should be --$E_i(t)=(y(t)-Y_i(t))^2$--.

At Column 13, line 64, "$Y_i(t)$" should be --$Y_i(t)$--.

UNITED STATES PATENT AND TRADEMARK OFFICE
CERTIFICATE OF CORRECTION

PATENT NO.       : 7,113,834 B2
APPLICATION NO.  : 10/419582
DATED            : September 26, 2006
INVENTOR(S)      : Wilhelm K. Wojsznis et al.

It is certified that error appears in the above-identified patent and that said Letters Patent is hereby corrected as shown below:

At Column 14, line 28, "$E_/(t)$" should be --$E_i(t)$--.

At Column 14, line 28, "$E_/(t)=(y(t)-Y_/(t))^2$" should be --$E_i(t)=(y(t)-Y_i(t))^2$--.

At Column 14, line 29, "$Y_/(t)$" should be --$Y_i(t)$--.

At Column 14, line 32, "Wherein" should be -- wherein --.

At Column 15, line 60, "$E_/(t)$" should be --$E_i(t)$--.

At Column 15, line 61, "$(y(t)-Y_/(t))^2$" should be --$(y(t)-Y_i(t))^2$--.

At Column 15, line 62, "$Y_1(t)$" should be --$Y_i(t)$--.

At Column 17, line 8, "$E_1(t)$" should be --$E_i(t)$--.

At Column 17, line 9, "$(y(t)-Y_1(t))^2$" should be --$(y(t)-Y_i(t))^2$--.

At Column 17, line 10, "$Y_1(t)$" should be --$Y_i(t)$--.

Signed and Sealed this

Twenty-third Day of October, 2007

JON W. DUDAS
*Director of the United States Patent and Trademark Office*